US007685593B2

(12) United States Patent
Solomon et al.

(10) Patent No.: US 7,685,593 B2
(45) Date of Patent: Mar. 23, 2010

(54) SYSTEMS AND METHODS FOR SUPPORTING MULTIPLE GAMING CONSOLE EMULATION ENVIRONMENTS

(75) Inventors: Andrew R. Solomon, Kent, WA (US); Matthew C. Priestley, Issaquah, WA (US); Michael Courage, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1350 days.

(21) Appl. No.: 11/128,613

(22) Filed: May 12, 2005

(65) Prior Publication Data

US 2006/0281556 A1    Dec. 14, 2006

(51) Int. Cl.
G06F 9/44 (2006.01)
A63F 9/24 (2006.01)
A63F 13/00 (2006.01)
G06F 15/00 (2006.01)
G06F 9/455 (2006.01)

(52) U.S. Cl. .................. 717/170; 717/134; 717/135; 463/1; 463/43; 712/209; 712/227; 703/26; 703/27; 703/28

(58) Field of Classification Search ......... 717/134–135, 717/168–170; 703/26–28; 712/209, 227; 463/1, 43
See application file for complete search history.

(56) References Cited

U.S. PATENT DOCUMENTS 5,548,717 A * 8/1996 Wooldridge et al. ........ 717/124

| 6,026,238 | A  | * | 2/2000  | Bond et al. ............. 717/141 |
| 6,192,512 | B1 | * | 2/2001  | Chess .................. 717/127 |
| 6,546,554 | B1 | * | 4/2003  | Schmidt et al. .......... 717/176 |
| 6,964,033 | B2 | * | 11/2005 | Wallman et al. ......... 717/118 |
| 7,069,205 | B1 | * | 6/2006  | Carroll et al. ........... 703/24 |
| 2005/0097520 | A1 | * | 5/2005 | Wolters et al. .......... 717/134 |
| 2006/0107122 | A1 | * | 5/2006 | Kasahara .............. 714/38 |

OTHER PUBLICATIONS

Conley et al., "Use of a Game Over: Emulation and the Video Game Industry, A White Paper"; Northwestern Univ. School of Law, Northwestern Journal of Technology and Intellectual Property, vol. 2, No. 2, Spring, 2004; 30 pg.*

(Continued)

*Primary Examiner*—Wei Y Zhen
*Assistant Examiner*—Ryan D Coyer
(74) *Attorney, Agent, or Firm*—Woodcock Washburn LLP

(57) ABSTRACT

Multiple versions of a runtime system, such as a software emulation application that emulates a legacy hardware architecture, are allowed to co-exist in the memory of a new hardware architecture. The operating system software of the new hardware architecture reads configuration data from a database or table to decide which version of the runtime system is desirable for an application program or game that is being loaded or is currently running, and, if a match is found, only that runtime system is invoked. To reduce storage footprint, the different versions of the runtime system may be stored using "differential patching" techniques. In this configuration, the operating system will always launch the same basic runtime system binary, but it will select a different differential patch to apply at run-time based on the title as determined during the database lookup. In this fashion, future changes to the runtime system to correct software bugs, incompatibility issues, and the like only need to be tested for the relevant target application programs or games.

18 Claims, 7 Drawing Sheets

OTHER PUBLICATIONS

Golub et al., "MVM—an environment for running multiple DOS, Windows, and DPMI programs on the microkernel"; USENIX, Proceedings of the USENIX Mach III Symposium, 1993, p. 173-90.*

Magnusson et al., "Simics: A Full System Simulation Platform," IEEE, 2002, 9 pg.*

Welch et al., "Zubin: A Software Engineering Environment for Interconnecting Legacy Virtual Environments"; Univ. Md. Dept. Comp. Sci., Nov. 25, 1996; 12 pg.*

* cited by examiner

SYSTEMS AND METHODS FOR SUPPORTING MULTIPLE GAMING CONSOLE EMULATION ENVIRONMENTS

FIELD OF THE INVENTION

The invention is directed to systems and methods for distributing software updates to software systems in a virtual machine (VM) environment and, more particularly, the invention is directed to systems and methods for distributing updates to runtime systems and storing multiple versions of the runtime systems that may be accessed based on the version of the runtime system that is needed to run a particular software application.

BACKGROUND OF THE INVENTION

When updating hardware architectures of computer systems such as game consoles to implement faster, more feature rich hardware, developers are faced with the issue of backwards compatibility to the legacy computer system for application programs or games developed for the legacy computer system platform. In particular, it is commercially desirable that the updated hardware architecture support application programs or games developed for the legacy hardware architecture. However, if the updated hardware architecture differs substantially, or radically, from that of the legacy hardware architecture, architectural differences between the two systems may make it very difficult, or even impossible, for legacy application programs or games to operate on the new hardware architecture without substantial hardware modification and/or software patches. Since customers generally expect such backwards compatibility, a solution to these problems is critical to the success of the updated hardware architecture.

To assure that a new hardware architecture provides complete backwards compatibility to a legacy hardware architecture, one solution is to validate the operation of every application program or game written for the legacy hardware architecture in the new hardware architecture. In the case of a game system such as Xbox, for example, over 750 Xbox games would have to be validated at extraordinary expense with an associated time delay to product release. This problem is shared by any software application platform, and no computer system developer relishes the thought of testing an entire library of application programs or games each time the hardware architecture is changed. A technique to avoid this costly validation process, while still providing support to legacy application programs or games, is desired.

Cost and lack of sufficient technology prevent the solution of the backwards compatibility problems using hardware. Also, re-mastering an existing library of legacy application programs or games is extraordinarily cumbersome and expensive, and thus also undesirable. On the other hand, one approach to this problem that has been successfully used is to emulate the legacy hardware on the new hardware using hardware emulation techniques whereby one or more actual legacy hardware components is included in the new hardware device. For example, the Sony PlayStation 2 game system runs PlayStation 1 games by invoking a hardware emulator that emulates the hardware of the PlayStation 1 architecture. Unfortunately, this approach also has its problems in that it requires the legacy hardware and new hardware to be quite similar and may not be modified once shipped, thereby significantly limiting the upgrade path for the hardware platform.

Fortunately, recent advances in PC architecture and software emulation have provided hardware architectures for computers, even game consoles, that are powerful enough to enable the emulation of legacy application programs or games in software rather than hardware. Such software emulators translate the title instructions for the application program or game on the fly into device instructions understandable by the new hardware architecture. This software emulation approach is particularly useful for backwards compatibility for computer game consoles since the developer of the game console maintains control over both the hardware and software platforms and is quite familiar with the legacy games.

However, a problem remains with the use of software emulators for backwards compatibility. Problems may develop with backwards compatibility for certain legacy application programs or games whereby changing the underlying software platform may destabilize the software emulation of the legacy application program or game. Unfortunately, the fixes themselves could destabilize legacy application programs and games in unexpected ways. As noted above, re-certifying the emulation software against all of the application programs and games is not a desirable option. Accordingly, a solution is required that enables the developer of the computer hardware architecture or game system to change the emulation software, the application programs, or the games without destabilizing the compatibility between the legacy system and the new system. Also, it is desired to enable emulation of only a subset of legacy application programs or games at launch of the emulator product and to enable addition of emulation support for additional application programs or games at a later time so that launch of the emulation product need not be held up until all legacy products are certified. The present invention addresses these needs in the art.

SUMMARY OF THE INVENTION

The invention avoids the backwards compatibility problems outlined above by devising an update protocol that avoids such problems. Rather than updating the software emulation system binary in place to address software bugs and the like, multiple versions of the software emulation application are allowed to co-exist in the persistent memory of the new hardware architecture. Operating system software reads configuration data from a database or table to decide which version of the emulator is desirable for an application program or game that is being loaded or is currently running, and, if a match is found, only that emulator is invoked. In this fashion, future changes only need to be tested for the relevant target application programs or games.

To reduce storage footprint, the different versions of the emulator may be stored using "differential patching" techniques. In other words, the operating system will always launch the same basic emulator binary, but it will select a different differential patch to apply at run-time based on the title under emulation as determined during the database lookup.

Those skilled in the art will appreciate that the invention may be used to update all sorts of middleware, not just emulators. Moreover, while any application platform may benefit from the invention, it will be appreciated that the invention is especially useful for hardware platforms that have a moderate to large number of applications and a significant investment in making sure those applications continue to work. A computer game console is a good example of such a device, but other consumer electronics may also benefit from the techniques of the invention. Additional characteristics of the invention will be apparent to those skilled in the art based on the following detailed description.

BRIEF DESCRIPTION OF THE DRAWINGS

The systems and methods for providing backward compatibility for runtime systems in accordance with the invention are further described with reference to the accompanying drawings, in which.

DETAILED DESCRIPTION OF ILLUSTRATIVE EMBODIMENTS

Overview

Figure 1A:
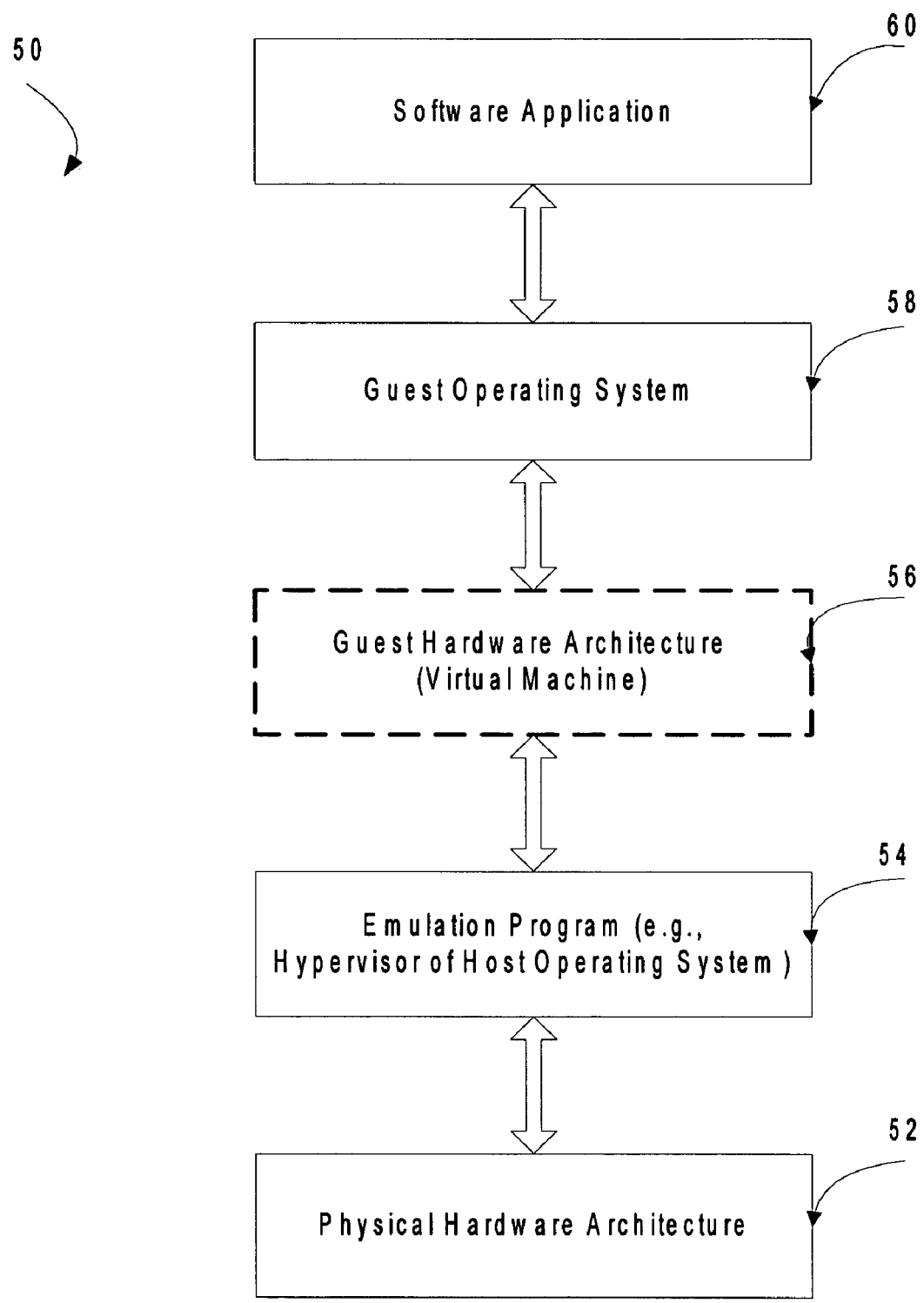
FIG. 1A is a block diagram representing the logical layering of the hardware and software architecture for an emulated operating environment in a computer system.

The invention provides systems and methods for avoiding the backwards compatibility problems of the prior art. Rather than updating the software emulation system binary in place to address software bugs and the like, multiple versions of the software emulation application are allowed to co-exist in the memory of the new hardware architecture. Operating system software reads configuration data from a database or table to decide which version of the emulator is desirable for an application program or game that is being loaded or is currently running, and, if a match is found, only that emulator is invoked. As a result, future changes only need to be tested for the relevant target application programs or games.

Other more detailed aspects of the invention are described below, but first, the following description provides a general overview of and some common vocabulary for virtual machines, emulators, and associated-terminology as the terms have come to be known in connection with operating systems and host processor ("CPU") virtualization techniques. In doing so, a set of vocabulary is set forth that one of ordinary skill in the art may find useful for the description that follows of the apparatus, systems and methods for improving backward compatibility using software emulation techniques in accordance with the invention.

Overview of Virtual Machines

Computers include general purpose central processing units (CPUs) or "processors" that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by International Business Machines (IBM) or Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format, while the Motorola PowerPC instruction set is based on the Reduced Instruction Set Computer (RISC) format. CISC processors use a large number of instructions, some of which can perform rather complicated functions, but which generally require many clock cycles to execute. RISC processors, on the other hand, use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Generally speaking, computer manufacturers try to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include a virtualizer program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and programs written for PC-based computer systems. It may also be possible to use virtualizer programs to execute concurrently on a single CPU multiple incompatible operating systems. In this latter arrangement, although each operating system is incompatible with the other, virtualizer programs can host each of the several operating systems and thereby allowing the otherwise incompatible operating systems to run concurrently on the same host computer system.

When a guest computer system is emulated on a host computer system, the guest computer system is said to be a "virtual machine" as the guest computer system only exists in the host computer system as a pure software representation of the operation of one specific hardware architecture. Thus, an operating system running inside virtual machine software such as Microsoft's Virtual PC may be referred to as a "guest" and/or a "virtual machine," while the operating system running the virtual machine software may be referred to as the "host." Similarly, the operating system in a legacy game system running inside virtual machine or emulation software inside a new game system may be referred to as the "guest," while the operating system of the new game system running the virtual machine or emulation software may be referred to as the "host." The terms virtualizer, emulator, direct-executor, virtual machine, and processor emulation are sometimes used interchangeably to denote the ability to mimic or emulate the hardware architecture of an entire computer system using one or several approaches known and appreciated by those of skill in the art. Moreover, all uses of the term "emulation" in any form is intended to convey this broad meaning and is not intended to distinguish between instruction execution concepts of emulation versus direct-execution of operating system instructions in the virtual machine. Thus, for example, Virtual PC software available from Microsoft Corporation "emulates" (by instruction execution emulation and/or direct execution) an entire computer that includes an Intel 80X86 Pentium processor and various motherboard components and cards, and the operation of these components is "emulated" in the virtual machine that is being run on the host machine. A virtualizer program executing on the operating system software and hardware architecture of the host computer, such as a computer system having a PowerPC processor, mimics the operation of the entire guest computer system.

The general case of virtualization allows one processor architecture to run OSes and programs from other processor architectures (e.g., PowerPC Mac programs on x86 Windows, and vice versa), but an important special case is when the underlying processor architectures are the same (run various versions of x86 Linux or different versions of x86 Windows on x86). In this latter case, there is the potential to execute the Guest OS and its applications more efficiently since the underlying instruction set is the same. In such a case, the guest instructions are allowed to execute directly on the processor without losing control or leaving the system open to attack (i.e., the Guest OS is sandboxed). This is where the separation of privileged versus non-privileged and the techniques for controlling access to memory comes into play. For virtualization where there is an architectural mismatch (PowerPC<->x86), two approaches could be used: instruction-by-instruction emulation (relatively slow) or translation from the guest instruction set to the native instruction set (more efficient, but uses the translation step). If instruction emulation is used, then it is relatively easy to make the environment robust; however, if translation is used, then it maps back to the special case where the processor architectures are the same.

In accordance with the invention, the guest operating system is virtualized and thus an exemplary scenario in accordance with the invention would be emulation of a Windows95®, Windows98®, Windows 3.1, or Windows NT 4.0 operating system on a Virtual Server or an Xbox operating system on an Xbox game console available from Microsoft Corporation. In various embodiments, the invention thus describes systems and methods for controlling guest access to some or all of the underlying physical resources (memory, devices, etc.) of the host computer.

The virtualizer program acts as the interchange between the hardware architecture of the host machine and the instructions transmitted by the software (e.g., operating systems, applications, etc.) running within the emulated environment. This virtualizer program may be a host operating system (HOS), which is an operating system running directly on the physical computer hardware (and which may comprise a hypervisor). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it.

Processor emulation thus enables a guest operating system to execute on a virtual machine created by a virtualizer running on a host computer system comprising both physical hardware and a host operating system.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that the software layers are running on their own private computer system, and thus VMs can allow multiple "guest systems" to run concurrently on a single "host system." This level of abstraction is represented by the illustration of FIG. 1A.

FIG. 1A is a diagram representing the logical layering of the hardware and software architecture for an emulated operating environment in a computer system. In the figure, an emulation program 54 runs directly or indirectly on the physical hardware architecture 52. Emulation program 54 may be (a) a virtual machine monitor that runs alongside a host operating system, (b) a specialized host operating system having native emulation capabilities, or (c) a host operating system with a hypervisor component wherein the hypervisor component performs the emulation. Emulation program 54 emulates a guest hardware architecture 56 (shown as broken lines to illustrate the fact that this component is the "virtual machine," that is, hardware that does not actually exist but is instead emulated by said emulation program 54). A guest operating system 58 executes on the guest hardware architecture 56, and software application 60 runs on the guest operating system 58. In the emulated operating environment of FIG. 1A—and because of the operation of emulation program 54—software application 60 may run in computer system 50 even if software application 60 is designed to run on an operating system that is generally incompatible with the host operating system and hardware architecture 52.

Figure 1B:
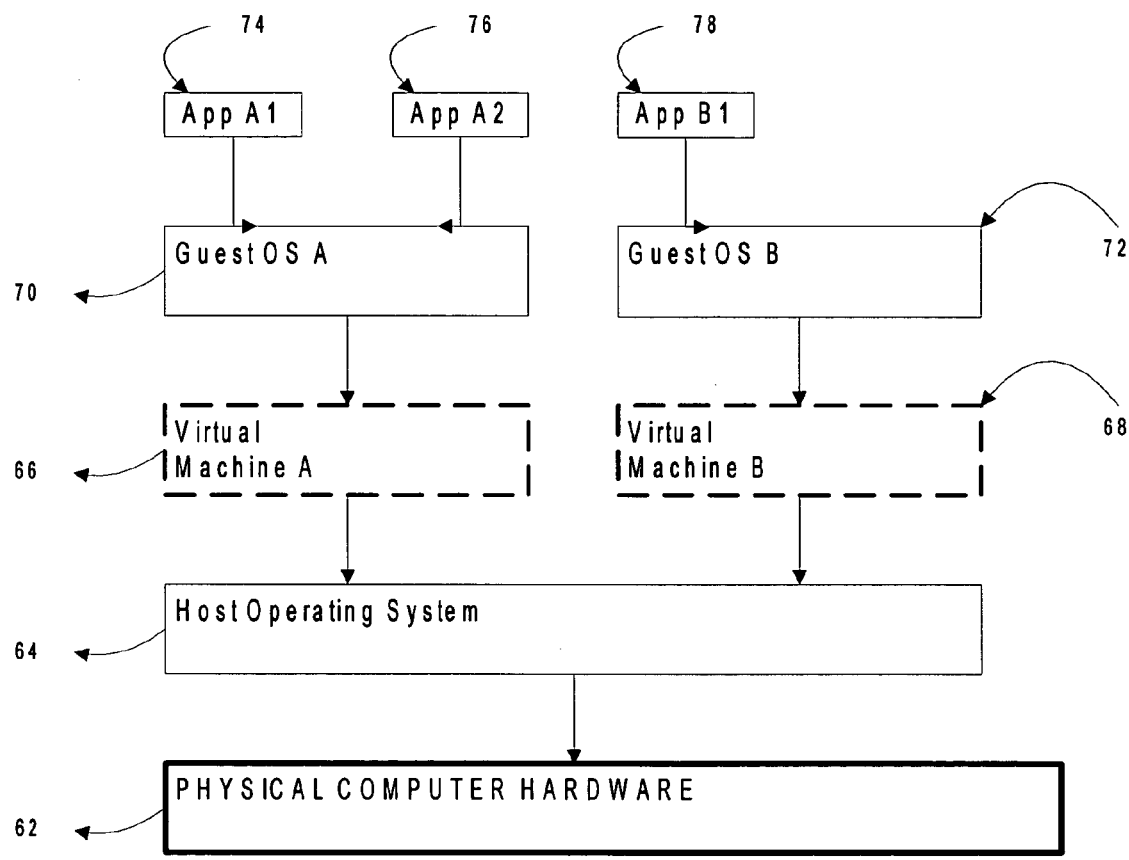
FIG. 1B is a block diagram representing a virtualized computing system wherein the emulation is performed by the host operating system (either directly or via a hypervisor)

FIG. 1B illustrates a virtualized computing system comprising a host operating system software layer 64 running directly above physical computer hardware 62 where the host operating system (host OS) 64 provides access to the resources of the physical computer hardware 62 by exposing interfaces that are the same as the hardware the host OS is emulating (or "virtualizing")—which, in turn, enables the host OS 64 to go unnoticed by operating system layers running above it. Again, to perform the emulation the host OS 64 may be a specially designed operating system with native emulations capabilities or, alternately, it may be a standard operating system with an incorporated hypervisor component for performing the emulation (not shown).

As shown in FIG. 1B, above the host OS 64 are two virtual machine (VM) implementations, VM A 66, which may be, for example, a virtualized Intel 386 processor, and VM B 68, which may be, for example, a virtualized version of one of the Motorola 680X0 family of processors. Above each VM 66 and 68 are guest operating systems (guest OSes) A 70 and B 72 respectively. Running above guest OS A 70 are two applications, application A1 74 and application A2 76, and running above guest OS B 72 is application B1 78.

In regard to FIG. 1B, it is important to note that VM A 66 and VM B 68 (which are shown in broken lines) are virtualized computer hardware representations that exist only as software constructs and which are made possible due to the execution of specialized emulation software(s) that not only presents VM A 66 and VM B 68 to Guest OS A 70 and Guest OS B 72 respectively, but which also performs all of the software steps necessary for Guest OS A 70 and Guest OS B 72 to indirectly interact with the real physical computer hardware 62.

Figure 1C:
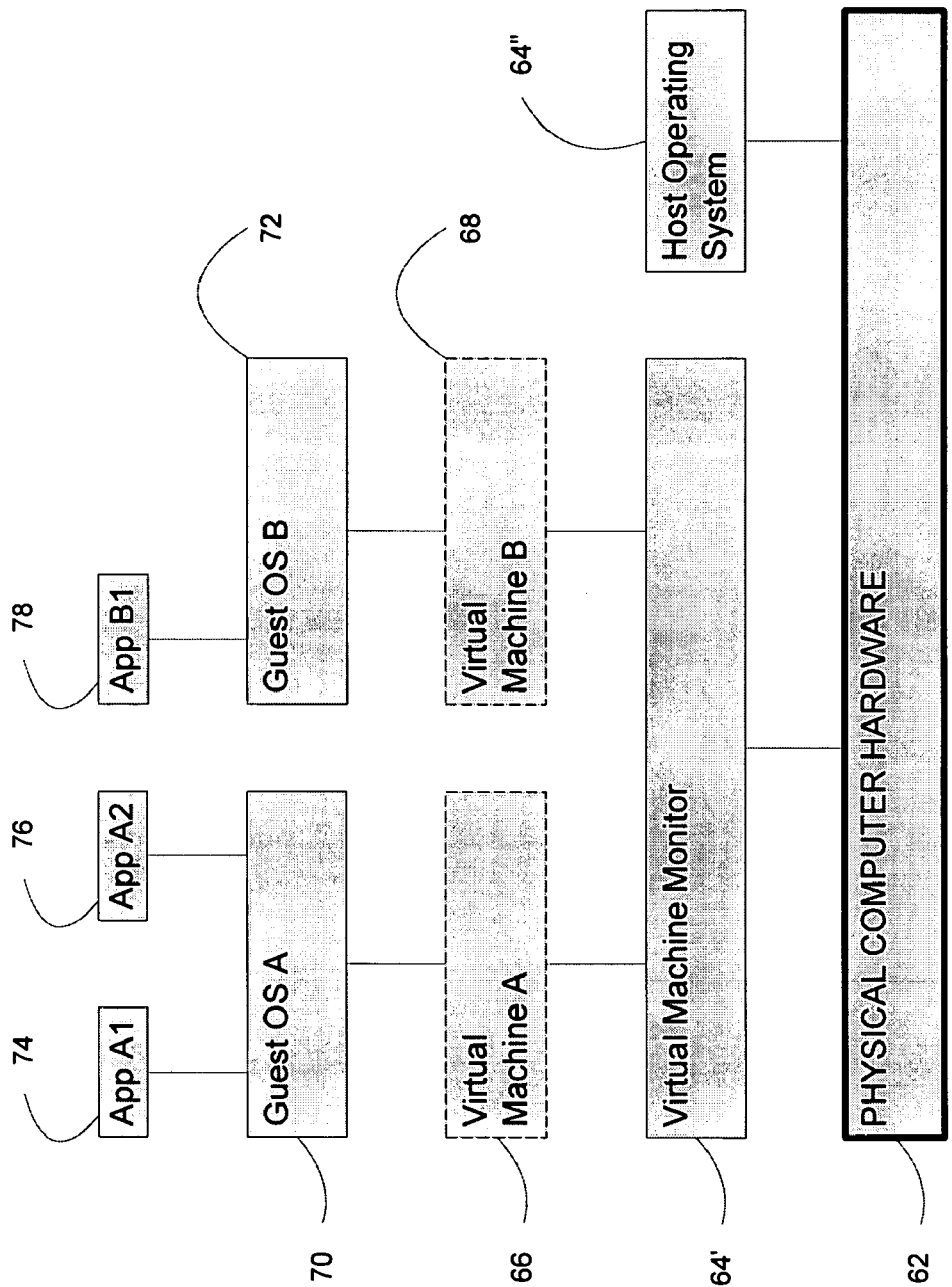
FIG. 1C is a block diagram representing an alternative virtualized computing system wherein the emulation is performed by a virtual machine monitor running side-by-side with a host operating system.

FIG. 1C illustrates an alternative virtualized computing system wherein the emulation is performed by a virtual machine monitor (VMM) 64' running alongside the host operating system 64". For certain embodiments the VMM 64' may be an application running above the host operating system 64" and interacting with the physical computer hardware 62 only through the host operating system 64". In other embodiments, and as shown in FIG. 1C, the VMM 64' may instead comprise a partially independent software system that on some levels interacts indirectly with the computer hardware 62 via the host operating system 64" but on other levels the VMM 64' interacts directly with the computer hardware 62 (similar to the way the host operating system interacts directly with the computer hardware). And in yet other embodiments, the VMM 64' may comprise a fully independent software system that on all levels interacts directly with the computer hardware 62 (similar to the way the host operating system 64" interacts directly with the computer hardware 62) without utilizing the host operating system 64" (although still interacting with said host operating system 64" insofar as coordinating use of the computer hardware 62 and avoiding conflicts and the like).

All of these variations for implementing the virtual machine are anticipated to form alternative embodiments of the invention as described herein, and nothing herein should be interpreted as limiting the invention to any particular emulation embodiment. In addition, any reference to interaction between applications 74, 76, and 78 via VM A 66 and/or VM B 68 respectively (presumably in a hardware emulation scenario) should be interpreted to be in fact an interaction between the applications 74, 76, and 78 and the virtualizer that has created the virtualization. Likewise, any reference to interaction between applications VM A 66 and/or VM B 68 with the host operating system 64 and/or the computer hardware 62 (presumably to execute computer instructions directly or indirectly on the computer hardware 62) should be interpreted to be in fact an interaction between the virtualizer that has created the virtualization and the host operating system 64 and/or the computer hardware 62 as appropriate.

Multiple Emulators for Stable Backwards Compatibility

As noted above, when using a software emulator to provide backward compatibility, changes to the software emulator could destabilize legacy application programs or games in unexpected ways. However, it would be extraordinarily expensive to re-certify the software emulator against every legacy application program or game every time the software emulator is patched. Instead, the developer of the upgraded computer or game system in accordance with the invention would handle changes to the software emulator as follows.

Prior to shipping the software emulator supporting backwards compatibility, it is preferably certified against as many legacy application programs or games as possible to assure proper operation. After shipment of the software emulator, if serious problems or bugs occur in application programs or games against which the software emulator was certified (i.e., those that shipped before the software emulator was released), and it is commercially reasonable to fix such problems or bugs, a patched version of the software emulator would be released that would be loaded into the computer or game system and allowed to co-exist with the original software emulator. Only application programs or games known to be incompatible with the original software emulator would invoke this new patched software emulator, thereby avoiding re-certification costs. A table in the operating system of the computer or game system would be updated to reflect that those application programs or games known to be incompatible with the original software emulator should run on the patched software emulator. This process would be repeated each time the software emulator is patched. Such patches may be made automatically through on-line connections or included on disks in accordance with known procedures.

On the other hand, if an application program or game designed for the legacy computer or game platform is released after the software emulator, and such application program or game has a serious defect or bug when run on the software emulator, then a patch or update will need to be provided to the purchasers of these new application programs or games. The patched software emulator could be distributed to such purchasers as described above, or else the patch could be added to the application program or game for re-certification. In the latter case, the patched software emulator would only need to be provided to those who had received the application program or game that does not run on the existing software emulator. Of course, the defective application program or game could also be exchanged for the re-certified patched application program or game once it becomes available.

In the case of a serious security or policy bug that would require a global fix of all software emulators, the software emulator would need to be re-certified and a patch released in conventional ways: the patch could be posted as a mandatory auto-update over the Internet, the fixed files could be released on demo disks, and/or the hard drives could be recalled and replaced. Future versions of the product containing the software emulator would include the patched software emulator.

Figure 2:
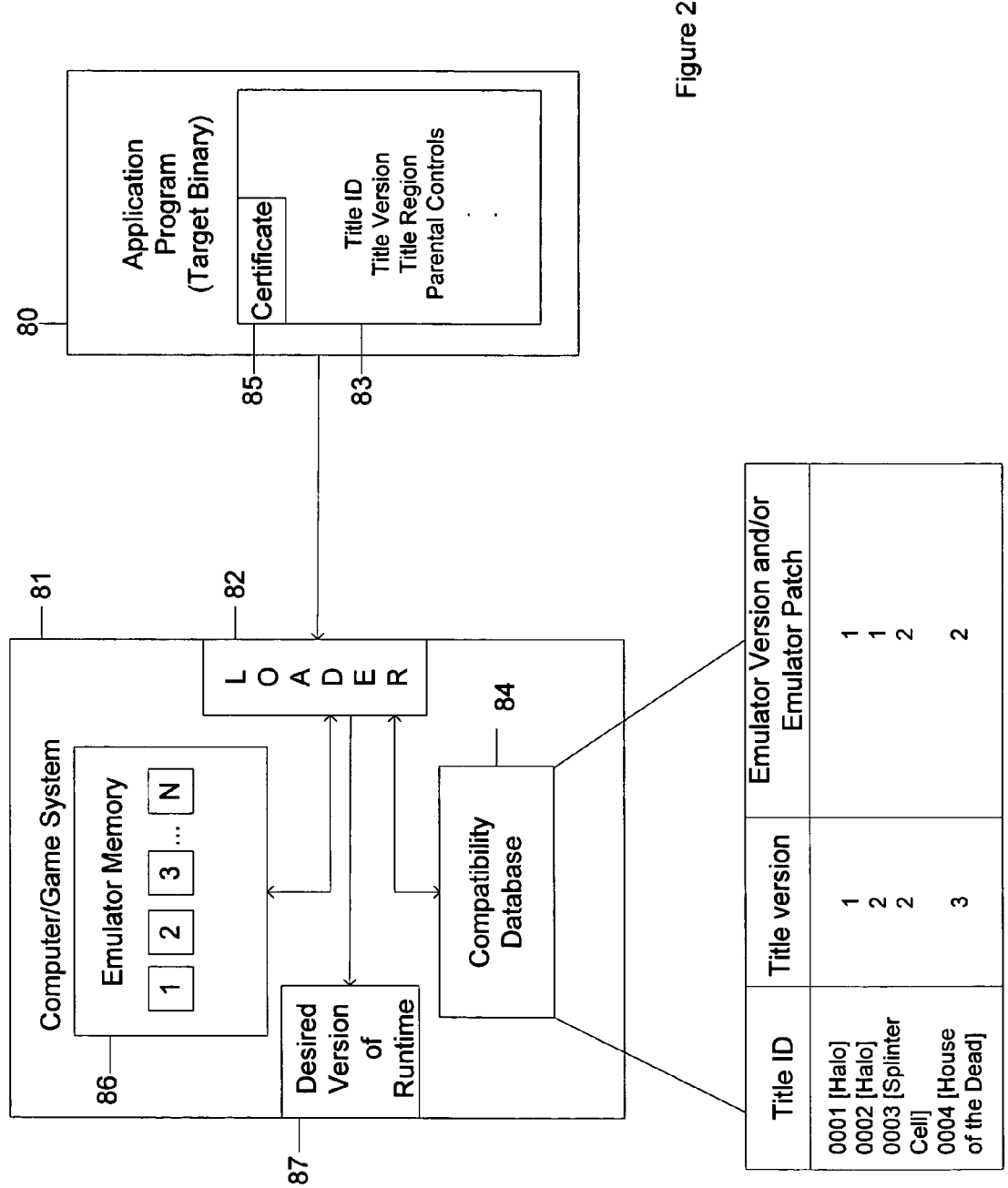
FIG. 2 illustrates a device configuration for providing backward compatibility in accordance with the invention.

The invention thus enables backwards compatibility for supporting legacy application programs or games on a new hardware architecture or game console by providing multiple software emulators whose operation is verified against respective legacy application programs or games. FIG. 2 illustrates an exemplary embodiment of the invention.

As illustrated in FIG. 2, when a user inserts a media containing an application program or computer game (target binary) 80 into the upgraded computer/game system 81 (for example, by inserting a DVD into a DVD drive of the computer/game system 81), the kernel of the operating system of the upgraded computer/game system 81 first verifies that the media contains an application program or game that may be executed by the upgraded computer/game system 81. If so, the kernel passes the executable target binary to a portion of the operating system known as loader 82 for execution. The loader 82 must be able to launch both the native target binaries 80 designed for the upgraded computer/game system 81 and the legacy target binaries designed for the legacy computer/game system. To determine which case is applicable, the loader 82 inspects the header 83 of the target binary 80. If the target binary 80 is a legacy target binary, then the loader 82 decides whether to evoke a software emulator for emulation of the legacy system's environment. Typically, the software emulator is evoked unless the legacy target binary conflicts with parental controls or conflicts with the region of the computer/game system 81 as determined by reading header 83.

Once it has been established by loader 82 that the target binary 80 should run, the loader 82 selects which version of the software emulator to invoke using the techniques of the invention. In particular, the loader 82 checks a compatibility database 84 that is included in the software emulator shipped with the upgraded computer/game system 81. As illustrated in FIG. 2, the compatibility table (database) 84 maps the properties of legacy application programs or computer game titles to specific versions of the software emulator. In the examples illustrated, two different versions of the computer game Halo are shown to be supported by version 1 of the software emulator, while version 2 of the computer game Splinter Cell and version 3 of the computer game House of the Dead are shown to be supported by version 2 of the software emulator. As also indicated, if the target binary 80 is not supported by, or is incompatible with, the upgraded computer/game system 81, then the compatibility database 84 reflects this and causes the launch of the target binary 80 to fail gracefully. In an exemplary embodiment, if an application program or game is not supported by the upgraded computer/game system 81, then its title will not appear in the list of supported application programs or games. Generally, when the media containing the target binary 80 is inserted into the upgraded computer/game system 81, the header 83 is checked and the title ID or some other unique identifier of the target binary 80 is compared with the title ID or other unique identifier stored in the compatibility database until a match is found. If the target binary 80 is a new title, then the title ID or other unique identifier, as well as the title version and emulator version may be read from a directory on the media containing target binary 80 by the loader 82 and used to patch the compatibility database 84 prior to the search.

In accordance with the invention, the unique identifier of the target binary 80 read by the loader 82 may be a hash of the applications certificate header (which contains, inter alia, the title ID) of the application program or computer game, or may be a hash of all or part of the application program or computer game 80. In such embodiments, the hash of the relevant part of the application program or game is computed and then that hash is compared to the hashes stored in the compatibility database 84. On the other hand, the unique identifier could be a unique characteristic of the application program or computer game such as an indication of a special hardware component (such as a joystick) that is needed to operate the application program or computer game. Those skilled in the art will appreciate that other unique identifiers may be created and stored in a certificate 85 as indicated in FIG. 2.

Once the loader 82 has read the unique identifier and found the emulator version in the compatibility database 84, then the loader 82 will either launch the named emulator version stored in emulator memory 86 or, in the case of explicit incompatibility, will abort and display a backwards compatibility error. On the other hand, if the loader 82 cannot find the unique identifier in the compatibility database 84, then it will launch the target binary 80 with a default emulator version. The resulting run-time system is loaded into memory for execution as a desired version of runtime 87 (FIG. 2).

Figure 3:
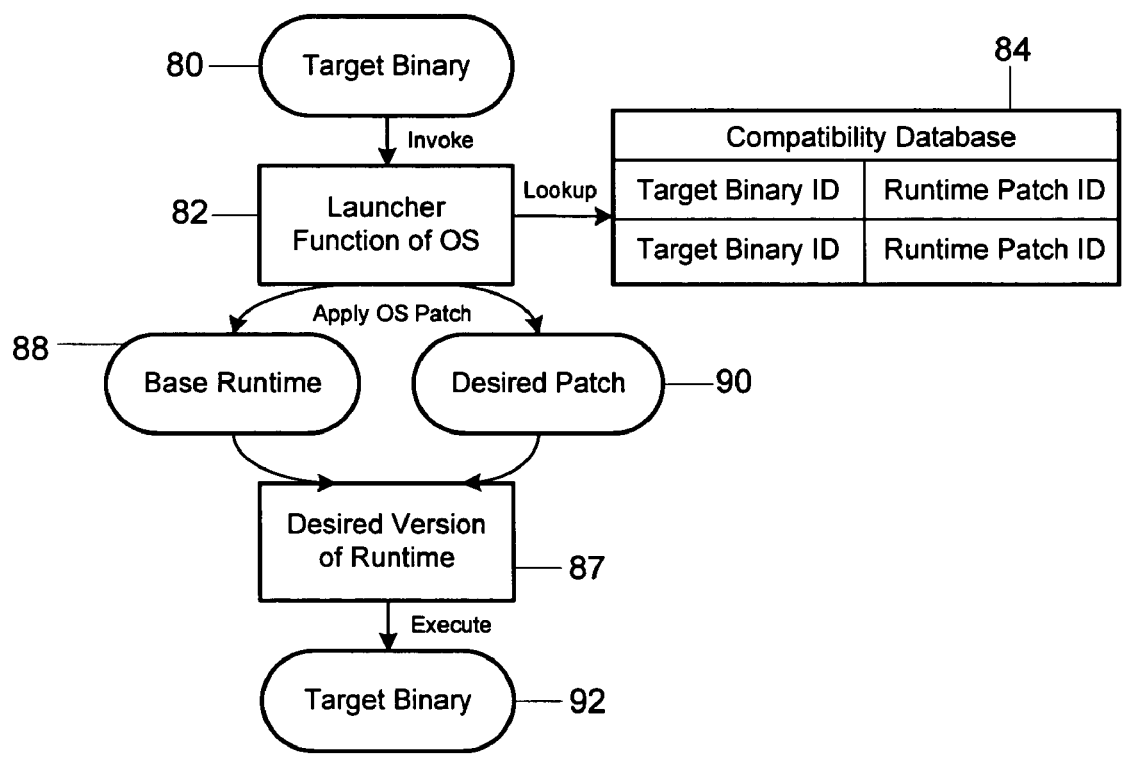
FIG. 3 illustrates the initiation of a legacy application program or game using a differentially patched software emulator using the techniques of the invention.

FIG. 3 illustrates a procedural flow of an embodiment of the invention in which the software emulator versions are stored using "differential patching" in order to minimize the storage footprint in memory 86. In this embodiment, the loader 82 will always launch the same base runtime code 88 but will also select and apply a differential patch 90 from the compatibility database 84 to create the desired version of runtime 87 for execution of the target binary at 92. In this case, the compatibility database 84 will identify the differential patch 90 rather than the version of the software emulator as in the above example.

Thus, the invention allows multiple copies of a run-time system, such as a software emulator, to be stored in a computer or game system at the same time. A layer of the operating system uses the techniques described herein to decide which run-time system to execute to run the application program or computer game on the inserted media. Those skilled in the art will appreciate that such techniques may be extended to all sorts of middleware, not just emulators. In accordance with the invention, the version of the middleware or software emulator, etc. that is needed to best support a legacy software application or computer game is invoked when that particular legacy software application or computer game is loaded, while the majority of application programs or computer games may continue to run on the middleware or software emulator against which the application program or computer game has been certified, thus assuring backwards compatibility in a commercially reasonable manner, even when the upgraded computer or game platform has been changed dramatically.

Exemplary Networked and Distributed Environments

Although an exemplary embodiment of the invention may be implemented in connection with the Xbox game system architecture, one of ordinary skill in the art can appreciate that the invention can be implemented in connection with any suitable host computer or other client or server device, which can be deployed as part of a computer network, or in a distributed computing environment. In this regard, the invention pertains to any computer system or environment having any number of memory or storage units, and any number of applications and processes occurring across any number of storage units or volumes, which may be used in connection with virtualizing a guest OS in accordance with the invention. The invention may apply to an environment with server computers and client computers deployed in a network environment or distributed computing environment, having remote or local storage. The invention may also be applied to standalone computing devices, having programming language functionality, interpretation and execution capabilities for generating, receiving and transmitting information in connection with remote or local services.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes of the invention.

Figure 4A:
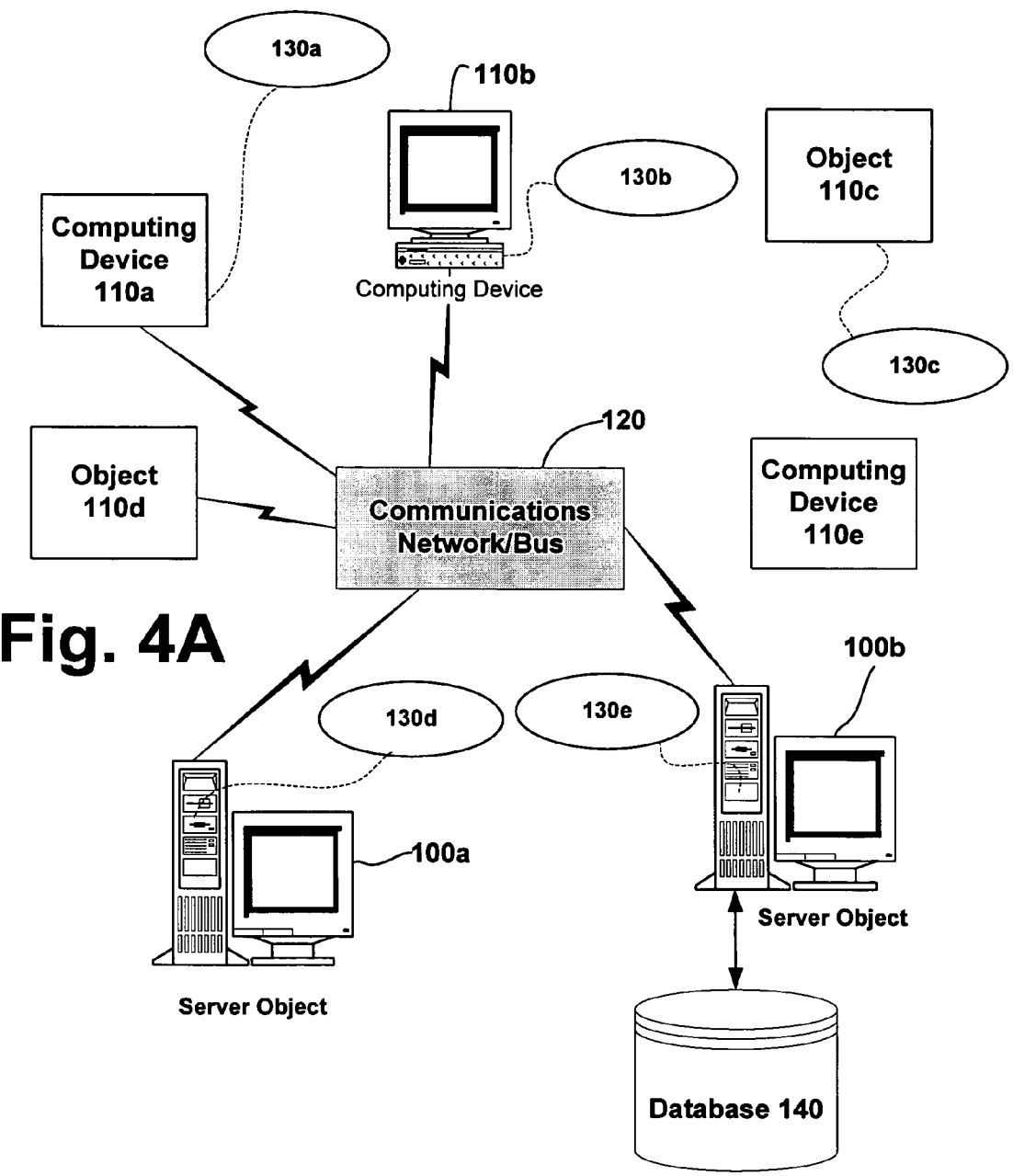
FIG. 4A is a block diagram representing an exemplary network environment having a variety of computing devices in which the invention may be implemented.

FIG. 4A provides a schematic diagram of an exemplary networked or distributed computing environment. The distributed computing environment comprises computing objects 100a, 100b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 120. This network may itself comprise other computing objects and computing devices that provide services to the system of FIG. 4A, and may itself represent multiple interconnected networks. In accordance with an aspect of the invention, each object 100a, 100b, etc. or 110a, 110b, 110c, etc. may contain an application that might make use of an API, or other object, software, firmware and/or hardware, to request use of the virtualization processes of the invention.

It can also be appreciated that an object, such as 110c, may be hosted on another computing device 100a, 100b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the virtualization processes of the invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the virtualized services in accordance with the invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself In a client/server architecture, particularly a networked system, a client is usually a computer that accesses shared network resources provided by another computer, e.g., a server. In the example of FIG. 4A, computers 110a, 110b, etc. can be thought of as clients and computers 100a, 100b, etc. can be thought of as the server where server 100a, 100b, etc. maintains the data that is then replicated in the client computers 110a, 110b, etc., although any computer can be considered a client, a server, or both, depending on the circumstances. Any of these computing devices may be processing data or requesting services or tasks that may implicate an implementation of the virtualization processes of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to making use of the virtualized architecture(s) of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

FIG. 4A illustrates an exemplary networked or distributed environment, with a server in communication with client computers via a network/bus, in which the invention may be employed. In more detail, a number of servers 100a, 100b, etc., are interconnected via a communications network/bus 120, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like. It is thus contemplated that the invention may apply to any computing device in connection with which it is desirable to implement guest interfaces and operating systems in accordance with the invention.

In a network environment in which the communications network/bus 120 is the Internet, for example, the servers 100*a*, 100*b*, etc. can be Web servers with which the clients 110*a*, 110*b*, 110*c*, 110*d*, 110*e*, etc. communicate via any of a number of known protocols such as HTTP. Servers 100*a*, 100*b*, etc. may also serve as clients 110*a*, 110*b*, 110*c*, 110*d*, 110*e*, etc., as may be characteristic of a distributed computing environment.

Communications may be wired or wireless, where appropriate. Client devices 110*a*, 110*b*, 110*c*, 110*d*, 110*e*, etc. may or may not communicate via communications network/bus 120, and may have independent communications associated therewith. For example, in the case of a TV or VCR, there may or may not be a networked aspect to the control thereof. Each client computer 110*a*, 110*b*, 110*c*, 110*d*, 110*e*, etc. and server computer 100*a*, 100*b*, etc. may be equipped with various application program modules or objects 130 and with connections or access to various types of storage elements or objects, across which files or data streams may be stored or to which portion(s) of files or data streams may be downloaded, transmitted or migrated. Any one or more of computers 100*a*, 100*b*, 110*a*, 110*b*, etc. may be responsible for the maintenance and updating of a database 140 or other storage element, such as a database or memory 140 for storing data processed according to the invention. Thus, the invention can be utilized in a computer network environment having client computers 110*a*, 110*b*, etc. that can access and interact with a computer network/bus 120 and server computers 100*a*, 100*b*, etc. that may interact with client computers 110*a*, 110*b*, etc. and other like devices, and databases 140.

Exemplary Computing Device

Figure 4B:
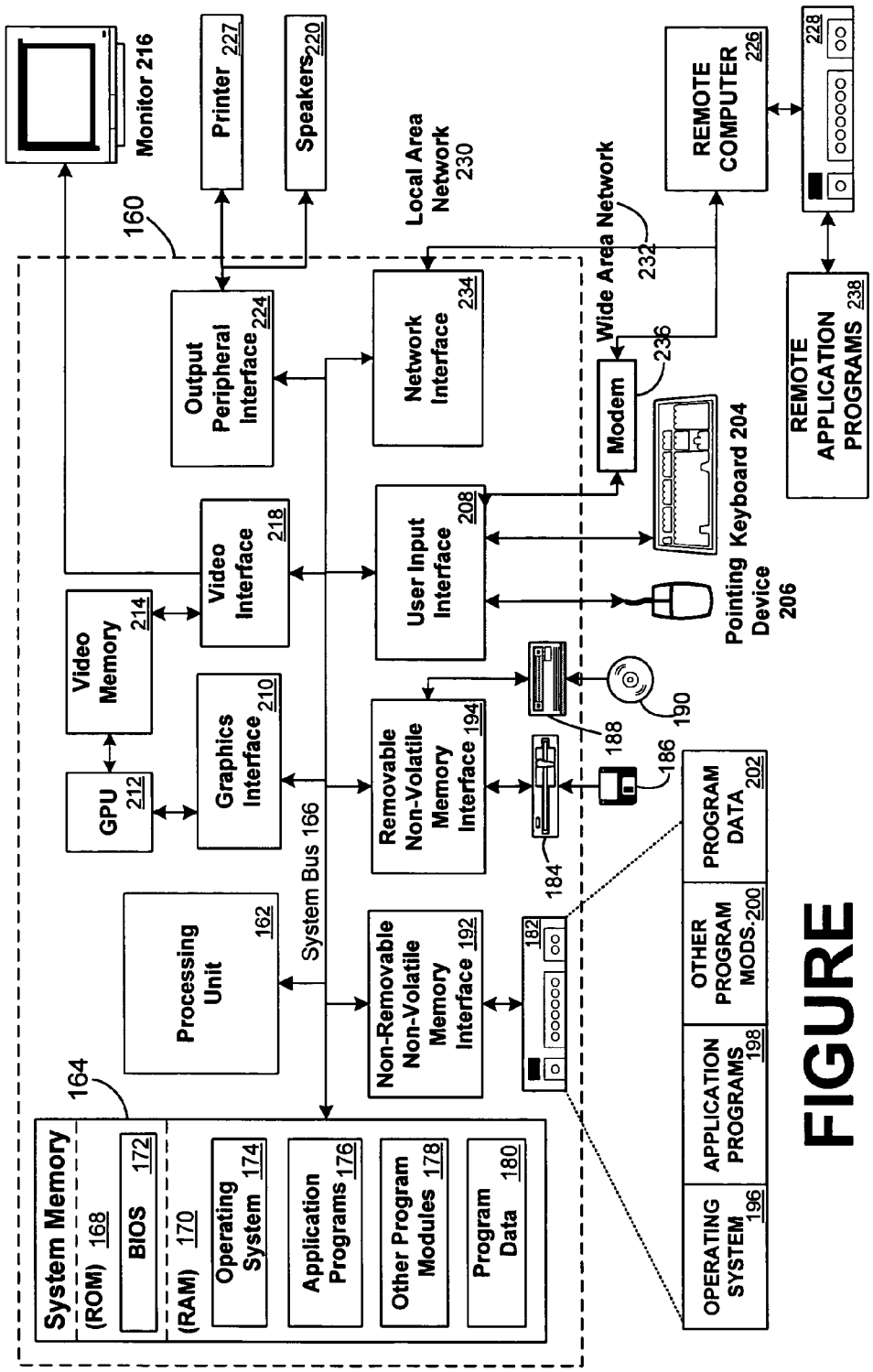
FIG. 4B is a block diagram representing an exemplary non-limiting host computing device in which the invention may be implemented.

FIG. 4B and the following discussion are intended to provide a brief general description of a suitable host computing environment in connection with which the invention may be implemented. It should be understood, however, that handheld, portable and other computing devices, portable and fixed gaming devices, and computing objects of all kinds are contemplated for use in connection with the invention. While a general purpose computer is described below, this is but one example, and the invention may be implemented with a thin client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the virtualization techniques in accordance with the invention.

Although not required, the invention can be implemented in whole or in part via an operating system, for use by a developer of services for a device or object, and/or included within application software that operates in connection with the virtualized OS of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. As noted above, the invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 4B illustrates an example of a suitable host computing system environment 150 in which the invention may be implemented, although as made clear above, the host computing system environment 150 is only one example of a suitable computing environment and is not intended to suggest any limitation as to the scope of use or functionality of the invention. Neither should the computing environment 150 be interpreted as having any dependency or requirement relating to any one or combination of components illustrated in the exemplary operating environment 150.

With reference to FIG. 4B, an exemplary system for implementing the invention includes a general purpose computing device in the form of a computer 160. Components of computer 160 may include, but are not limited to, a processing unit 162, a system memory 164, and a system bus 166 that couples various system components including the system memory to the processing unit 162. The system bus 166 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express (PCIe).

Computer 160 typically includes a variety of computer readable media. Computer readable media can be any available media that can be accessed by computer 160 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 160. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 164 includes computer storage media in the form of volatile and/or nonvolatile memory such as read only memory (ROM) 168 and random access memory (RAM) 170. A basic input/output system 172 (BIOS), containing the basic routines that help to transfer information between elements within computer 160, such as during start-up, is typically stored in ROM 168. RAM 170 typically contains data and/or program modules that are immediately accessible to and/or presently being operated on by processing unit 162. By way of example, and not limitation, FIG. 4B illustrates operating system 174, application programs 176, other program modules 178, and program data 180.

The computer 160 may also include other removable/non-removable, volatile/nonvolatile computer storage media. By way of example only, FIG. 4B illustrates a hard disk drive 182 that reads from or writes to non-removable, nonvolatile magnetic media, a magnetic disk drive 184 that reads from or writes to a removable, nonvolatile magnetic disk 186, and an optical disk drive 188 that reads from or writes to a removable, nonvolatile optical disk 190, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 182 is typically connected to the system bus 166 through a non-removable memory interface such as interface 192, and magnetic disk drive 184 and optical disk drive 188 are typically connected to the system bus 166 by a removable memory interface, such as interface 194.

The drives and their associated computer storage media discussed above and illustrated in FIG. 4B provide storage of computer readable instructions, data structures, program modules and other data for the computer 160. In FIG. 4B, for example, hard disk drive 182 is illustrated as storing operating system 196, application programs 198, other program modules 200 and program data 202. Note that these components can either be the same as or different from operating system 174, application programs 176, other program modules 178 and program data 180. Operating system 196, application programs 198, other program modules 200 and program data 202 are given different numbers here to illustrate that, at a minimum, they are different copies. A user may enter commands and information into the computer 160 through input devices such as a keyboard 204 and pointing device 206, commonly referred to as a mouse, trackball or touch pad. Other input devices (not shown) may include a microphone, joystick, game pad, satellite dish, scanner, or the like. These and other input devices are often connected to the processing unit 162 through a user input interface 208 that is coupled to the system bus 166, but may be connected by other interface and bus structures, such as a parallel port, game port or a universal serial bus (USB). These are the kinds of structures that are virtualized by the architectures of the invention. A graphics interface 210, such as one of the interfaces implemented by the Northbridge, may also be connected to the system bus 166. Northbridge is a chipset that communicates with the CPU, or host processing unit 162, and assumes responsibility for communications such as PCI, PCIe and accelerated graphics port (AGP) communications. One or more graphics processing units (GPUs) 212 may communicate with graphics interface 210. In this regard, GPUs 212 generally include on-chip memory storage, such as register storage and GPUs 212 communicate with a video memory 214. GPUs 212, however, are but one example of a coprocessor and thus a variety of coprocessing devices may be included in computer 160, and may include a variety of procedural shaders, such as pixel and vertex shaders. A monitor 216 or other type of display device is also connected to the system bus 166 via an interface, such as a video interface 218, which may in turn communicate with video memory 214. In addition to monitor 216, computers may also include other peripheral output devices such as speakers 220 and printer 222, which may be connected through an output peripheral interface 224.

The computer 160 may operate in a networked or distributed environment using logical connections to one or more remote computers, such as a remote computer 226. The remote computer 226 may be a personal computer, a server, a router, a network PC, a peer device or other common network node, and typically includes many or all of the elements described above relative to the computer 160, although only a memory storage device 228 has been illustrated in FIG. 4B. The logical connections depicted in FIG. 4B include a local area network (LAN) 230 and a wide area network (WAN) 232, but may also include other networks/buses. Such networking environments are commonplace in homes, offices, enterprise-wide computer networks, intranets and the Internet.

When used in a LAN networking environment, the computer 160 is connected to the LAN 230 through a network interface or adapter 234. When used in a WAN networking environment, the computer 160 typically includes a modem 236 or other means for establishing communications over the WAN 232, such as the Internet. The modem 236, which may be internal or external, may be connected to the system bus 166 via the user input interface 208, or other appropriate mechanism. In a networked environment, program modules depicted relative to the computer 160, or portions thereof, may be stored in the remote memory storage device. By way of example, and not limitation, FIG. 4B illustrates remote application programs 238 as residing on memory device 228. It will be appreciated that the network connections shown are exemplary and other means of establishing a communications link between the computers may be used.

There are multiple ways of implementing the invention, e.g., an appropriate API, tool kit, driver code, operating system, control, standalone or downloadable software object, etc. which enables applications and services to use the virtualized architecture(s), systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the invention have been described in connection with various computing devices and network architectures, the underlying concepts may be applied to any computing device or system in which it is desirable to emulate guest software. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the virtualization techniques of the invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the invention. Additionally, any storage techniques used in connection with the invention may invariably be a combination of hardware and software.

While the invention has been described in connection with the preferred embodiments of the various figures, it is to be understood that other similar embodiments may be used or modifications and additions may be made to the described embodiment for performing the same function of the invention without deviating therefrom. For example, while exemplary network environments of the invention are described in the context of a networked environment, such as a peer to peer networked environment, one skilled in the art will recognize that the invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the invention in the context of a guest OS virtualized on a host OS, the invention is not so limited, but rather may be implemented to virtualize a second specialized processing unit cooperating with a main processor for other reasons as well. Moreover, the invention contemplates the scenario wherein multiple instances of the same version or release of an OS are operating in separate virtual machines according to the invention. It can be appreciated that the virtualization of the invention is independent of the operations for which the guest OS is used. It is also intended that the invention applies to all computer architectures, not just the Windows architecture. Still further, the invention may be implemented in or across a plurality of processing chips or devices, and storage may similarly be effected across a plurality of devices. Therefore, the invention should not be limited to any single embodiment, but rather should be construed in breadth and scope in accordance with the appended claims.

What is claimed:

1. A system for running a computer game application program having a unique identifier, comprising:
   a processor that concurrently instantiates at least two run-time systems, wherein the at least two run-time systems co-exist in a system memory and wherein said at least two run-time systems are emulators that emulate different legacy game consoles for running computer game application programs;
   a table that stores identifier values correlating the computer game application program corresponding to each identifier value to a first run-time system of said at least two run-time systems on which the computer game application program may run, the first run-time system being included in the computer game application program; and
   an application loader that reads the unique identifier of the computer game application program to be loaded and compares said unique identifier to the identifier values stored in said table to determine that the computer game application program identified by said unique identifier is supported by the first run-time system of said at least two run-time systems, said application loader further launching the first run-time system to run said computer game application program identified by said unique identifier.

2. A system as in claim 1, wherein said application loader is a portion of an operating system of a game console that runs said computer game.

3. A system as in claim 2, wherein said table is a portion of a database of said game console.

4. A system as in claim 1, wherein said unique identifier is a title identifier of said computer game.

5. A system as in claim 1, wherein said unique identifier is a hash of an applications certificate header of said computer game.

6. A system as in claim 1, wherein said unique identifier is a hash of said application program.

7. A system as in claim 1, wherein said unique identifier is a unique characteristic of said application program and said application loader analyzes said application program to determine if said application program has said unique characteristic.

8. A system as in claim 1, wherein said at least two run-time systems are emulators that emulate different hardware platforms that may run said application program.

9. A system as in claim 8, wherein said emulators are differentially patched, whereby said one of said at least one run-time systems is launched by said application loader by launching a base emulator and a differential patch corresponding to said unique identifier.

10. A method of running a computer game application program having a unique identifier, comprising:
- concurrently processing at least two run-time systems in a computer system into which said computer game application program is loaded to run, wherein the at least two run-time systems co-exist in a system memory and wherein said at least two run-time systems are emulators that emulate different legacy game consoles for running computer game application programs;
- reading the unique identifier of the computer game application program;
- comparing the read unique identifier to identifier values stored in a table correlating the computer game application program corresponding to each identifier value to a first run-time system of said at least two run-time systems on which the computer game application program may run, the first run-time system included in the computer game application program; and
- upon determining that the first run-time system of said at least two run-time systems supports said computer game application program, launching the first run-time system to run said computer game application program identified by said unique identifier.

11. A method as in claim 10, wherein said unique identifier is a hash of an applications certificate header of a computer game and said comparing step comprises the step of comparing the hash of the applications certificate header of the computer game to hash values stored in said table.

12. A method as in claim 10, wherein said unique identifier is a hash of said application program and said comparing step comprises the step of comparing the hash of said application program to hash values stored in said table.

13. A method as in claim 10, wherein said unique identifier is a unique characteristic of said application program, comprising the further step of analyzing said application program to determine if said application program has said unique characteristic.

14. A method as in claim 10, wherein said launching step comprises the step of launching the emulator identified by said unique identifier for running said application program.

15. A method as in claim 14, wherein said emulators are differentially patched, and said launching step comprises the steps of launching a base emulator and launching a differential patch corresponding to said unique identifier so as to create a desired version of the run-time system.

16. A computer readable storage medium containing computer executable instructions that when executed by a computer system configures said computer system to run a computer game application program having a unique identifier, by implementing a system comprising:
- a table containing identifier values correlating the computer game application program corresponding to each identifier value to a first run-time system of at least two run-time systems on which the computer game application program may run, wherein the first run-time system is included in the application program and the at least two run-time systems are concurrently instantiated and co-exist in a system memory and wherein said at least two run-time systems are emulators that emulate different legacy game consoles for running computer game application programs; and
- software that reads the unique identifier of the computer game application program, compares the read unique identifier to said identifier values stored in said table, and if the first run-time system supports said computer game application program, launches the first run-time system to run said computer game application program identified by said unique identifier.

17. A computer readable storage medium as in claim 16, wherein said software launches the emulator identified by said unique identifier for running said application program.

18. A computer readable storage medium as in claim 17, wherein said emulators are differentially patched, and said software launches a base emulator and a differential patch corresponding to said unique identifier so as to create a desired version of the run-time system.

* * * * *